(12) United States Patent
Sullivan

(10) Patent No.: US 8,591,616 B2
(45) Date of Patent: Nov. 26, 2013

(54) DIRECT REPLACEMENT FILTER WITH AUTOMATIC PLEATED FILTER MEDIA ADVANCE

(76) Inventor: Challen Sullivan, Delray Beach, FL (US)

( * ) Notice: Subject to any disclaimer, the term of this patent is extended or adjusted under 35 U.S.C. 154(b) by 0 days.

(21) Appl. No.: 13/407,765

(22) Filed: Feb. 29, 2012

(65) Prior Publication Data

US 2012/0222560 A1     Sep. 6, 2012

Related U.S. Application Data

(63) Continuation-in-part of application No. 12/953,402, filed on Nov. 23, 2010, which is a continuation-in-part of application No. 12/585,514, filed on Sep. 16, 2009, now Pat. No. 8,313,567.

(51) Int. Cl.
*B01D 46/00*       (2006.01)

(52) U.S. Cl.
USPC ................... 55/354; 55/351; 55/352; 95/277; 96/429

(58) Field of Classification Search
USPC .......... 55/351, 352, 354; 95/273, 277; 96/429
See application file for complete search history.

(56) References Cited

U.S. PATENT DOCUMENTS

| | | | |
|---|---|---|---|
| 1,982,639 A | 12/1934 | Christofferson | |
| 2,016,991 A | 10/1935 | Dollinger | |
| 2,500,123 A | 3/1950 | Gwaltney et al. | |
| 2,808,899 A | 10/1957 | Hofstetter | |
| 3,276,191 A | 10/1966 | Revell | |
| 3,321,345 A | 5/1967 | Duncan et al. | |
| 3,337,898 A | 8/1967 | Schmid et al. | |
| 3,408,795 A | 11/1968 | Revell et al. | |
| 3,596,442 A | 8/1971 | Neumann | |
| 3,695,008 A | 10/1972 | Neumann | |
| 3,774,373 A | 11/1973 | Welch et al. | |
| 3,985,528 A | 10/1976 | Revell | |
| 4,054,521 A | 10/1977 | Winzen | |

(Continued)

FOREIGN PATENT DOCUMENTS

| | | |
|---|---|---|
| DE | 19654844 | 7/1998 |
| JP | 6079194 | 3/1994 |

(Continued)

OTHER PUBLICATIONS http://www.joehurleyinc.com/OPTIMAIR/optimair.html.

*Primary Examiner* — Robert Clemente
(74) *Attorney, Agent, or Firm* — Tangent Law Group, PLLC; Eric J. Weierstall, Esq.

(57) ABSTRACT

The invention is directed to a direct replacement filter having a housing with an exposure slot with a filter media storage area having unexposed folded, pleated filter media stored therein, being unexposed pleated, folded, and stacked to be compactly held within storage area. An at least one motor is coupled to a power supply and in communication with a controller. An at least movement member is coupled to an at least one support member coupled to the media. A containment area also provided where the controller signals the motor engaging the movement member which is driven such that the movement member drives the at least one support member which engages the unexposed folded pleated filter material, moving the unexposed folded pleated filter media the storage area toward the containment area and moving an exposed portion of the filter media through the at least one exposure slot toward the containment area.

17 Claims, 13 Drawing Sheets

(56) References Cited

U.S. PATENT DOCUMENTS

| | | |
|---|---|---|
| 4,221,576 A | 9/1980 | Phillips, Jr. |
| 4,394,146 A | 7/1983 | Klein |
| 4,405,342 A * | 9/1983 | Bergman .................. 95/69 |
| 4,470,833 A | 9/1984 | Wolfe |
| 5,098,767 A | 3/1992 | Linnersten |
| 5,217,513 A | 6/1993 | Armbruster |
| 5,405,434 A | 4/1995 | Inculet |
| 5,560,835 A | 10/1996 | Williams |
| 5,906,752 A | 5/1999 | Williams |
| 5,912,423 A | 6/1999 | Dought et al. |
| 6,152,998 A | 11/2000 | Taylor |
| 6,168,646 B1 | 1/2001 | Craig et al. |
| 6,402,822 B1 | 6/2002 | Najm |
| 6,454,834 B1 | 9/2002 | Livingstone |
| 6,491,735 B2 | 12/2002 | Najm |
| 6,596,059 B1 | 7/2003 | Geist et al. |
| 6,632,269 B1 | 10/2003 | Najm |
| 6,743,282 B2 | 6/2004 | Najm |
| 6,843,834 B2 | 1/2005 | Schumacher |
| 7,151,264 B2 | 12/2006 | Ehlers, Sr. |
| 7,186,290 B2 | 3/2007 | Sheehan et al. |
| 7,244,294 B2 | 7/2007 | Kates |
| 8,313,567 B2 | 11/2012 | Sullivan |
| 2005/0150382 A1 | 7/2005 | Sheehan et al. |
| 2006/0070527 A1 | 4/2006 | Chapman et al. |
| 2006/0102006 A1 | 5/2006 | Powell |
| 2008/0072763 A1 | 3/2008 | Hauville |

FOREIGN PATENT DOCUMENTS

| | | |
|---|---|---|
| JP | 11104416 | 4/1994 |
| JP | 6233945 | 8/1994 |
| JP | 6246120 | 9/1994 |
| JP | 7275626 | 10/1995 |

* cited by examiner

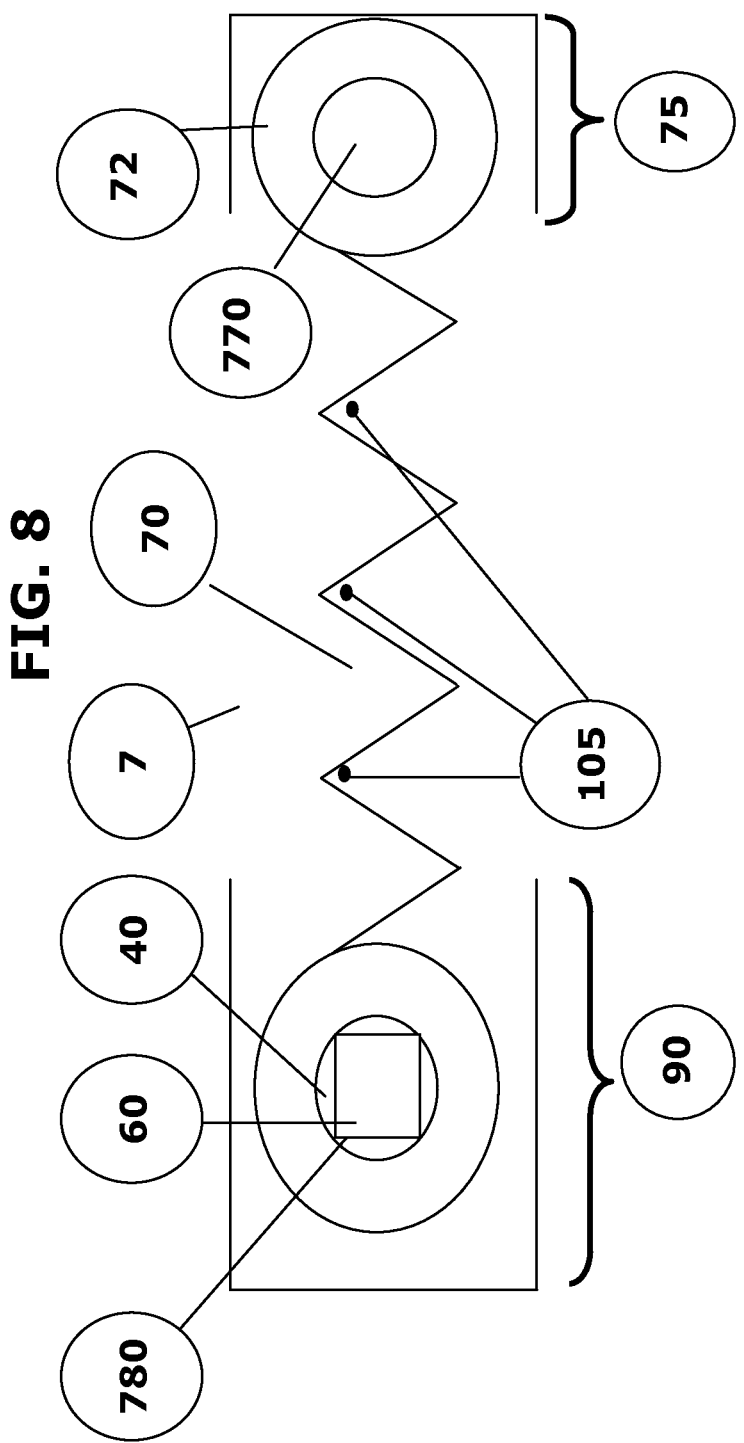

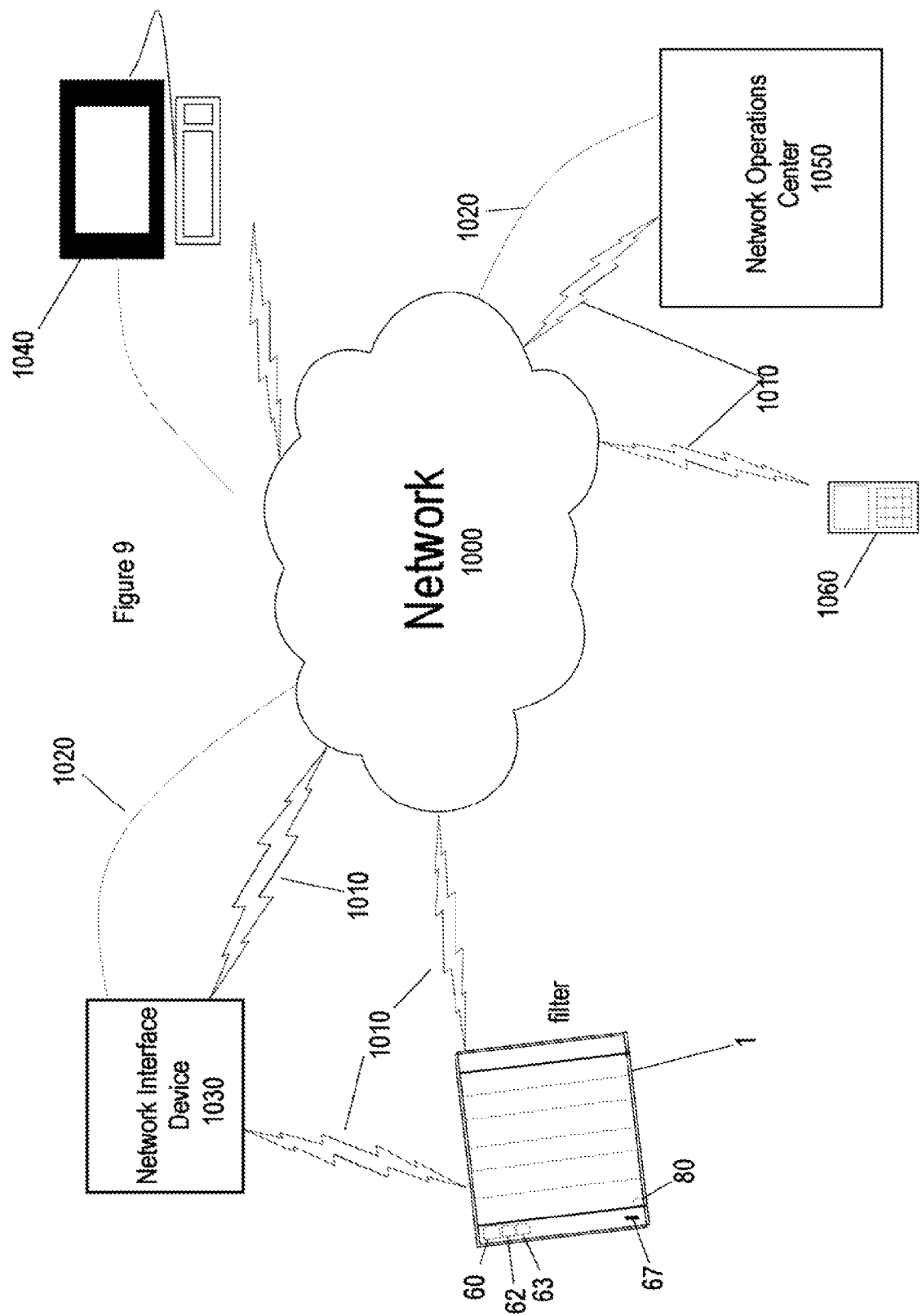

DIRECT REPLACEMENT FILTER WITH AUTOMATIC PLEATED FILTER MEDIA ADVANCE

CROSS-REFERENCE TO RELATED APPLICATIONS

This application is a continuation-in-part of and claims priority to Ser. No. 12/953,402 Nov. 23, 2010 which is a Continuation-In-Part of U.S. patent application Ser. No. 12/585,514, filed Sep. 16, 2009, all of which are incorporated herein by reference.

BACKGROUND OF THE INVENTION

1. Field of the Invention

The invention is directed to a direct replacement filter, in an exemplary embodiment having a unitary housing. The unitary housing having a standard width for filters so as to be a direct replacement for existing standard filters and future air filters. The housing contains a movement member, a motor, a power source, a controller and a filter media. The product strives to be both directly replaceable with a filter and disposable with minimum environmental impact. The replacement filter being further located within a channel in the air handler unit wherein the air is passed within the channel and passed through the filter media. The replacement air filter having a compacted or stored portion of the filter media that is moved out to replace the initial and subsequent sections of filter media exposed by the invention to air within the air handler unit. Additional aspects of the invention include remote monitoring and communication with the air filtration unit or air handler, enabling monitoring and alert for replacement of the air filter. Additionally, the air filtration unit or air handler may be enabled to monitor and communicate air quality and to take further actions in response to alerts sent through a network.

2. Background of the Invention

An important component in almost all Heating, Ventilation and Air Conditioning (HVAC) and air filtration units in general is a filtration mechanism for removal of particulates and contaminants from the air flow. In HVAC systems this is preferably before or sometimes after coming into contact with heat exchanging elements. The removal of the contaminants helps prevent reduction in heat transfer associated with accumulation of the contaminants on the heat exchanger elements. Additionally, the removal of these contaminants also improves the quality of the air circulated by the HVAC air handling system. The timing for replacing or renewing these filtration mechanisms is therefore important in both improving efficiency and maintaining air quality in most air filtration applications.

In most systems a filter is used through which the air is passed. Dirty filters result in lower flow rates of air which translates to lower efficiency in air filtration, especially in HVAC systems where it equates to less heat exchange in the HVAC equipment. The equipment must run longer to accomplish the intended goals, for example contaminant filtration and/or temperature control. In HVAC for instance, air conditioning equipment may freeze up due to inadequate heat exchange. Additionally, the motors and other components must run longer and harder resulting in increased wear on the entire system, reducing its useful life. Thus, the filtration systems of air handler units require constant attention and maintenance. In commercial and industrial applications, it is often the case that the air handling functions are monitored by a control center and maintained based on performance measurements. For example, when utilizing multiple refrigeration units in chemical processing the timing and performance of the cooling units is often integral to the manufacturing process, these systems are therefore monitored and maintained based on sensor reports, typically from within the system itself or based on hours of operation. Upon determination by the controller or by a set schedule, the filters on such systems are replaced. Similarly, in residential settings, many HVAC companies sell maintenance contracts to residential clients, typically annual or bi-annual in nature, to address routine maintenance. However the removable, replaceable filters that are typically in these units require more frequent replacement by these clients.

Filters for most residential and commercial air filtration and air handling equipment are typically removable, replaceable, rigid, framed units. Rigid framed filters can be time consuming to replace or clean and often require frequent replacement, typically monthly. This also requires an added amount of attention by an industrial or commercial maintenance staff or residential unit owner. For instance, in a commercial setting the restaurant owner or similar commercial customer must provide an even greater amount of attention to cleaning and/or replacing these types of filters. The filters often go unchanged as users forget to change the filter regularly. This shortfall has been well known and several attempts have been made in the past to provide long lasting filters. Several attempts have been made to provide a reel system, see for example US Patent Application No. 2006/0102006, Japanese Patent No. JP06233945, German Patent No. DE19654844A1, U.S. Pat. Nos. 6,168,646, 4,470,833, 6,152, 998, 4221576.

Though these have extended lengths of service, in each instance, the resulting device requires either modification of the HVAC unit or extension of the device from the standard width and location of the filter. Additionally, these devices are often hardwired into the electrical system of the existing unit, requiring modification of the electrical connections within the existing HVAC unit. This makes these existing devices impractical for easy use by a typical end user. For example, as seen in U.S. Pat. Nos. 6,152,998, 6,632,269, 6,491,735, 6,402,822, and 6,743,282 and the commercially available OPTIMAIR system, often the reels are located outside the unit and are located in a reel storage area that is non-uniform in width. This also prevents direct replacement of the existing filter with these types of units as the footprints are completely different and these systems are not direct replacement for the existing filter.

Other commercial applications use sheets that are stretched between rolls on either side of an air duct, see for example U.S. Pat. No. 6,632,269 to Najm, U.S. Pat. No. 4,331,576 to Phillips Jr., or U.S. Pat. No. 6,152,998 to Taylor. In each embodiment, significant modifications to the HVAC or cooling system would need to be made to install the devices or they use a non-standard footprint. The systems do not provide retrofitting the filter structure to existing HVAC equipment and moreover, they require significant installation steps as outlined above with respect to residential units that operate in a similar manner.

Additional attempts have been made to address the issue in a commercial HVAC application, for instance U.S. Pat. No. 7,186,290 to Sheehan. In U.S. Pat. No. 7,186,290, a stack of filters is cycled through the device. This system requires a large amount of modification to incorporate into existing devices, as with other existing designs. Additionally, the stacks of stored filters require a significant amount of space in or around the HVAC unit. Thus, existing systems require either significant additional modifications or additional space to operate and provide extended use filter systems. Moreover, no economical method of providing a self-renewing or extended use air filter within the standard footprint of the existing filter housings has been provided. Similar shortcomings occur in filtration of other gases and liquids as well, for instance in water filtration. Although reference is made to an air filtration application throughout, the improved mechanisms for filtration can be adapted to other gasses and liquids.

A direct replacement filter would be one that fits into existing filter footprints as defined by the OEM. A uniform and industry standard width is provided in almost all residential and most commercial filters. Similarly, industrial applications, though often purpose built, have specific filter footprints after completion and replacement of these custom sizes is also contemplated. The filters shown in all of the above noted patents and publications are not direct replacement filters as they would require extensive modifications to fit in the place of the existing filters in these air handler and HVAC systems. In addition to not fitting a standard footprint, filter units like those shown would require opening and disposal of the spent filter media, exposing the user and the device to the contaminants that were already collected. Further the installation of the systems would require additional wiring and would likely require professional installation. Additionally, little or no communications are provided at the source of filtration, therefore, these systems cannot effectively communicate the status of the air being handled or further communicate with machinery or other devices.

To date, no commercially successful system has been produced for use in conventional air filtration or HVAC systems without modification or extending beyond the footprint provided for the replaceable filter, in other words a direct replacement for the filter. A direct replacement filter having a footprint that fits in the standard width provided in today's HVAC systems that has an extended use, while being more environmentally friendly and remaining sealed preventing re-exposure or re-admission of contaminants to the air and the system is needed. Moreover, no economical method of providing a self-renewing or extended use air filter within the standard footprint of the existing filter housings has been provided. Additionally, no filter to date with such extended use and standard footprints exists that can both store and communicate air quality through a sensor to a communications network and, based on that communication, prompt an alert to a user or control center.

There is, therefore, a need for a method and apparatus for providing for a self-renewing or extended use air filter for air handling and HVAC applications that has a standard footprint that fits within existing commercial and residential apparatus, provides extended useful life to the filter, requires little or not modification to install in existing equipment, facilitates and enhances communication of the air quality, communicates with other elements of the air handler or a network, and has a minimal impact on the environment when discarded. Further, though the exemplary embodiments are shown for replacement filters, in addition to air handlers and HVAC systems, the instant invention is adaptable to other air filtration applications, some non-limiting examples being spray booths, computers, room and building air purification, gaming machines, clean rooms, electronics manufacturing, and other applications utilizing air filtration with framed filters.

SUMMARY OF THE INVENTION

An object of the invention is to provide an extended life direct replacement filter that is fully disposable and is constructed with "green" materials so as to have a minimum impact on the environment when it is discarded.

Yet another object of the invention is to provide a sealed direct replacement filter to minimize re-admission and exposure to the collected contaminants during operation and replacement, the spent filter being contained within the housing. Unlike many roller systems which require removal or handling of the spent filter material, the instant invention minimizes this contact and the potential for readmission to the air handler.

A still further object of the instant invention is to provide a direct replacement air filter having a pleated, folded filter media with a controller, the pleated filter media and the controller being in a housing and the pleated media filter being distributed across a grid and folding at its pleats in the presence of air within an airflow channel. The controller moves the media within the housing over an extended period of time, while the housing fits a standard width or footprint for an existing air filter.

Yet another object of the invention is to provide measurement and reporting of the status or quality of the air being handled, with enhanced communications directly from the filter through sensors on the unit and provide communications with other devices or a network or both.

The invention includes an apparatus and a method for moving air filter media within the apparatus. The apparatus of the invention includes a direct replacement automatic media advancing filter within an air flow channel having a unitary housing with a uniform thickness throughout the length and width of the unitary housing and an at least one exposure slot. An at least one filter media storage area is provided having unexposed filter media stored therein, the unexposed filter media being pleated, folded, and stacked to be compactly held within the at least one filter media storage area and an at least one motor coupled to an independent power supply and in communication with a controller, the at least one motor moving an at least one movement member that advances or pays out an unexposed portion of the at least one filter media into the at least one exposure slot and exposes the unexposed portion of the at least one filter media to the air flow channel creating an exposed portion of the at least one filter media. The exposed portion is being paid out across an at least one supporting member with the at least one supporting member forcing the at least one filter media to fold at its pleats into a zig-zag pattern when placed into an air flow in the air flow channel and the paying out the at least one filter media being based on output from the controller. A containment area is also provided, wherein the exposed portion of the at least one filter media is collected and retained within the containment area.

The at least one movement member can be an at least one cord, wire, or string, and the at least one cord, wire, or string is further attached to the pleated filter media via reinforcement tabs, wherein the at least one cord, wire, or string is rolled up on a take-up roller for a pre-determined time or length and the exposed filter media is moved to the collection area and the exposed media is folded at its pleats and stored in a compacted state.

The at least one movement member can also be an at least one track with an at least one supporting spanning member, the at least one track member being moved by the motor and in turn moving the at least one spanning supporting member which engages the unexposed filter media at a pleat and carries the unexposed filter media from the at least one filter media storage area to the slot and then, upon a signal from the controller the motor further moves the track member and the at least one supporting and spanning member to move the now exposed filter media to the containment area.

The containment area can be sealed within the housing by a separate sealing element. The movement member can re-fold the at least one pleated filter media after its exposure and store it compactly in the containment area. When the at least one filter media is moved to the collection area and the exposed media can be folded at its pleats and stored in a compacted state, such that readmission of the filtered contaminants is minimized.

The unitary housing can be comprised of at least one of an environmentally friendly cellulose, an environmentally friendly cardboard, an environmentally friendly paper, and an environmentally friendly organic plastic like compound or plastic and the power source further comprises a lithium ion battery.

The controller can further include a clock or a programmed advancement profile, wherein the at least one movement member is engaged based on the clock or the programmed advancement profile.

The at least one movement member can be an at least one roller, the roller paying out the filter media from the pleated, folded storage area and taking up the exposed filter material and rolling it about the roller in a containment area. The at least one movement member can also be an at least one set of pinch rollers, the pinch rollers pulling the filter to pay out the filter media from the pleated, folded storage area and feeding the exposed filter media into a containment area. The at least one independent power supply can be a battery or battery pack. The unitary housing can be sealed throughout to prevent opening of the unitary housing.

The apparatus of the invention also includes a direct replacement filter system within an air flow channel within an air handler unit having a unitary housing comprised of at least one of at least one of an environmentally friendly cellulose, an environmentally friendly cardboard, an environmentally friendly paper, and an environmentally friendly organic plastic like compound or plastic having a uniform thickness of between about one inch and three inches throughout its length and width and having an exposure slot there through and the unitary housing being sealed throughout to prevent opening of the unitary housing; a motor coupled to a lithium ion battery power source and in communication with a controller having an at least one sensor input or a timer; and a filter media storage area located on one end of the unitary housing, with a pleated, folded filter media folded and compactly stored inside the filter media storage area, and an exposed filter media containment area located on an opposed end within the unitary housing with the filter media extending therebetween, the filter media being paid out from said filter media storage area across the housing and the exposure slot while being supported by an at least one support member where it is exposed to air within the air flow channel and folds along its pleats into a zig-zag pattern and removes contaminants from the air and is further passed through to a containment area where the filter media is re-folded, collected, and compactly stored with the filtered contaminants, the motor being activated by said controller in response to input from the at least one sensor or based on a timed input from said timer or programmed to move based on sensor data and moving an at least one movement member to move the filter media across the exposure area.

The method of the invention includes a method of moving a pleated filter media within a uniform length and width, direct replacement filter frame comprising the method steps of: storing an unexposed folded, pleated filter media compactly within an at least one filter media storage area storage; engaging an at least one motor coupled to an independent power supply in communication with a controller and the at least one motor moving an at least one movement member; paying out through the movement of the at least one movement member by the at least one motor an unexposed portion of the at least one filter media into an at least one exposure slot and exposing the unexposed portion of the at least one filter media to the air flow channel creating an exposed portion of the at least one filter media, the exposed portion being paid out across an at least one supporting member with the at least one supporting member forcing the at least one filter media to fold at its pleats into a zig-zag pattern when placed into an air flow in the air flow channel and the paying out of the at least one filter media being based on output from the controller; and collecting in a containment area the exposed portion of the at least one filter media and retaining it within the containment area.

The apparatus of the invention also includes a direct replacement filter within an air flow channel having a housing with an at least one exposure slot. An at least one filter media storage area within the housing is provided, having unexposed filter media stored therein, the unexposed filter media being pleated, folded, and stacked to be compactly held within the at least one filter media storage area. An at least one motor coupled to a power supply and in communication with a controller is also provided. The at least one motor moving an at least one movement member that pays out an unexposed portion of the at least one filter media into the at least one exposure slot and exposes the unexposed portion of the at least one filter media to the air flow channel creating an exposed portion of the at least one filter media. An at least one processing module is included and an at least one transceiver module on the controller and an at least one sensor, the controller communicating with the at least one sensor, the at least one sensor communicating data to the processing module and the controller, and the transceiver module transmitting data from the filter to a network or a storage device. A containment area is also included, wherein the exposed portion of the at least one filter media is collected and retained within the containment area.

The at least one sensor measures temperature, mold count, carbon monoxide, carbon dioxide, Volatile Organic Compounds (VOCs), smoke, fire, noxious gases, and air particle concentrations. The at least one sensor can also measure air flow and report estimated energy consumption to the network or storage device. The controller can communicate through the transceiver module with a further network interface device. The network interface device can be a wi-fi enabled device or an internet gateway. The filter communicates through the controller and transceiver module as a wi-fi enabled device to the network. The filter communicates through the controller and transceiver module communicate data from the at least one sensor to a network which in turn reports it to an alert device. The alert device, can be but is certainly not limited to: a cell phone, computer, or network enabled interface device. The alert device is a Network Operations Center or control center.

The method of the invention further includes a method of reporting a status of an at least one filter to a computer network including the steps of activating and registering a network enabled air filter with a network; starting operation of the at least one air filter within the air handler; monitoring the operation and performance of the at least one air filter through an onboard controller in communication with an at least one sensor in the air filter sending data to a controller; processing and comparing the data sent to the controller and comparing data against a set of parameters; reporting when the processed data is outside the set of parameters; and sending an alert to an alert device in communication with the network.

The monitoring step can include monitoring an amount of filter media through the at least one sensor and the method further comprises the method step of sending a further alert when the amount of filter media remaining reaches a preset minimum. The step of sending a further alert can also activate a dispensing step, the dispensing step comprising the mailing of a replacement filter to a specified address for the registered air filter. The sending of an alert can also send the alert to an end user and communicate the status of the air filter to a user through the alert device. The sending of an alert sends an alert to a security responder for an emergency response. The data from the at least one sensor can also measure and report estimated energy consumption to the alert device.

The apparatus of the invention further includes an air filtration direct replacement filter deployed within an air flow channel including a housing with an at least one exposure slot and an at least one filter media storage area within the housing, having unexposed filter media stored therein, the unexposed filter media being pleated, folded, and stacked to be compactly held within the at least one filter media storage area. An at least one motor is coupled to a power supply and in communication with a controller, the at least one motor moving an at least one movement member that advances an unexposed portion of the at least one filter media into the at least one exposure slot and exposes the unexposed portion of the at least one filter media to the air flow channel creating an exposed portion of the at least one filter media. An at least one processing module and an at least one transceiver module on the controller and an at least one sensor are included. The controller communicates with the at least one sensor, the at least one sensor communicates data to the processing module and the controller, and the transceiver module transmits data from the filter to a network or a storage device. A containment area, is provided wherein the exposed portion of the at least one filter media is collected and retained within the containment area. The at least one movement member comprises a first roller containing the unexposed filter media with pleats contained thereon and a second roller collecting the exposed, pleated filter media and further comprising an at least one support assisting in supporting the filter media on the pleats and assisting in producing a zig-zag pattern.

The apparatus of the invention further includes a direct replacement filter within a flow channel having a housing with an at least one exposure slot with an at least one filter media storage area within the housing, having unexposed folded, pleated filter media stored therein, the unexposed folded, pleated filter media being pleated, folded, and stacked to be compactly held within the at least one filter media storage area. An at least one motor is coupled to a power supply and in communication with a controller, the at least one motor moving an at least movement member coupled to an at least one support member. A containment area is provided wherein upon sending a signal from the controller the at least one motor is engaged and the at least one movement member is driven such that the at least movement member is moved, in turn moving the at least one support member which engages the unexposed folded pleated filter material in the at least one filter media storage area, moving the unexposed folded pleated filter media from being stored into being exposed in the at least exposure slot and moving an exposed portion of the filter media through the at least one exposure slot toward the containment area such that the at least one exposed portion of the filter media is moved to and then collected and retained within the containment area.

The at least one movement member can be an at least one threaded rod screw drive. The filter media can have individual pleats with an at least one portion of each pleat being adhered in a selectively releasable manner to the immediately preceding pleat such that the at least one threaded rod screw drive selectively releases the pleats by movement of the at least one support member. A pleat spacing member can be provided where the at least one pleat spacing member folds with the compression of the folded, pleated filter media when stored and maintains a desired pleat spacing in an uncompressed or unfolded state when moved into the at least one exposure slot.

The direct replacement filter can also include an at least one pleat support member, where the pleats are supported by the pleat support member. The pleat support member can be an at least on strip of double sided adhesive tape. MORE THAN TAPE IN THIS FILING? The at least one threaded rod screw drive can be moved along the top or bottom or top and bottom of the pleated filter media engaging the tops, troughs or tops and troughs of the pleats of the folded pleated filter media at a specified pleat spacing or pleats per inch related to the pitch of the at least one threaded rod screw drive aiding in the movement of the filter media into and from the at least one exposure slot.

The containment area can have a sealing member to seal the containment area. The at least one threaded rod screw drive movement can then re-fold the at least one pleated filter media after its exposure and store it compactly in the containment area. The filter can have an at least one sensor, wherein the sensor sends a signal to the controller to activate the at least one motor and move the at least one threaded rod screw drive. The controller can communicate data from the at least one sensor to an alert device. The controller can further comprise a clock or a programmed advancement profile, wherein the at least one threaded rod screw drive is engaged based on the clock or the programmed advancement profile.

The power supply can be a battery or battery pack or a conventional electrical power supply. The housing or frame can be a unitary being sealed throughout to prevent opening of the unitary housing. An at least one processing module and an at least one transceiver module can be provided on the controller and can also be provided with an at least one sensor, the controller communicating with the at least one sensor, the at least one sensor communicating data to the processing module and the controller, and the transceiver module transmitting data from the filter to a network or a storage device. The at least one sensor can measure temperature, mold count, carbon monoxide, carbon dioxide, Volatile Organic Compounds (VOCs), smoke, fire, noxious gases, and air particle concentrations. The at least one sensor may also measure air flow and reports estimated energy consumption to the network or storage device.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

FIG. 8 shows a still further embodiment of the invention.

FIG. 9 shows a plan view of an exemplary embodiment of the invention communicating with other devices or a network or both.

DETAILED DESCRIPTION OF THE INVENTION

Figure 1:
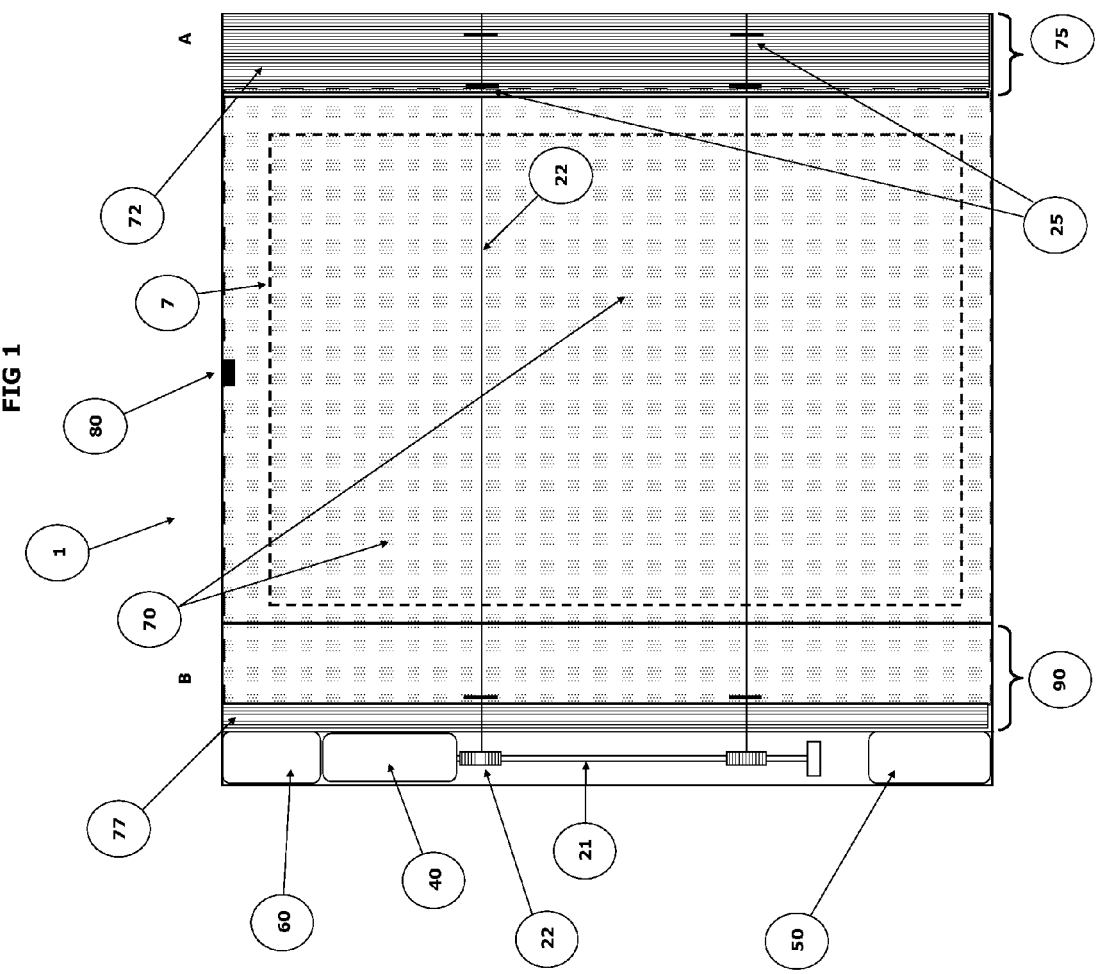
FIG. 1 illustrates a top view of an embodiment of the instant invention.

In describing the invention, the following definitions are applicable throughout.

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a lap top; a net book; a smart phone; a workstation; a micro-computer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, such as a CD-ROM and a DVD; a magnetic tape; a memory chip; a thumb drive; and a carrier wave used to carry computer-readable electronic data, such as those used in transmitting and receiving e-mail or in accessing a network.

"Software" refers to prescribed rules to operate a computer. Examples of software include: software; code segments; instructions; computer programs; applications; and programmed logic.

A "computer system" refers to a system having a computer, where the computer comprises a computer-readable medium embodying software to operate the computer.

A "network" refers to a number of computers, computer systems and associated devices that are connected by communication facilities. A network involves permanent connections such as cables or temporary connections such as those made through telephone or other communication links. Examples of a network include: an internet, such as the Internet; an intranet; a local area network (LAN); a wide area network (WAN); a cellular network; a wi-ft enabled network of computers; a network of security systems; and a combination of networks, such as an internet and an intranet or a WAN enabled Wi-Fi network through a wireless provider or any similar network element or network.

An "information storage device" refers to an article of manufacture used to store information. An information storage device has different forms, for example, paper form and electronic form. In paper form, the information storage device includes paper printed with the information. In electronic form, the information storage device includes a computer-readable medium storing the information as software, for example, as data.

In addition to the above definition, the instant invention utilizes a length of pre-pleated filter material for filtration. The material is typically used in air filtration and reference is made herein throughout to air filtration, but the process may be adapted to filter other gasses and/or fluids. One non-limiting example is water filtration assuming appropriate non-reactive adhesives are used and non-reactive structural members are used. Similarly, use of the apparatus and method to filter other fluids and gases is well within the spirit of the instant invention.

The instant invention is directed to a direct replacement filter having a housing. In the exemplary embodiments, the housing is a unitary sealed housing having a uniform thickness throughout and being of a standard width for filters so as to be a direct replacement filter for existing HVAC systems. The unitary housing contains, at least in part, an at least one motivator or movement element, a motor, and a power source, a controller and a filter media utilizing environmentally sensitive materials where feasible. The product is therefore both replaceable and disposable with minimum environmental impact. The direct replacement filter being further located within a channel in a filtration unit, for instance an air handler unit wherein air is passed within the channel and passed through the filter media.

The exemplary embodiments of the invention shown utilize a compacted "clean" portion of the filter media that is deployed, exposed, and collected within the housing. In most of the exemplary embodiments shown, the filter media is folded or pleated and stored in a storage section. A movement element in the embodiments is attached to the media. In response to the controller the motor moves the movement element, the movement element in turn moves the existing exposed media into a collection section where it folds and is stored and draws an unexposed portion into the exposure area and also draws or moves unexposed filter into the air channel. This movement of the filter media is produced by the movement element. This movement and storage of the media results in an extended length of operation for the direct replacement filter that does not require special installation, minimizes environmental impact after disposal, and is self-contained, thus minimizing readmission of containments. The filter media can, in an exemplary embodiment, be a pleated, folded filter media, the pleats providing added surface area in the exposure area. The filter media is collected and stored in a containment area preventing re-admission and re-exposure of the collected contaminants to the air or the air handler system.

FIG. 1 illustrates a top view of an embodiment of the instant invention. An air handler unit direct replacement air filter 1 is shown. The direct replacement air filter is located such that it is in a path or channel of the air being handled by an air handler (not shown). The direct replacement air filter 1 has a unitary housing 10. The unitary housing 10 has a uniform thickness throughout its length and width and is sealed and self-contained so as not to be opened by an operator or end user. The thickness typically being of a standard width for filters so as to be a direct replacement in existing air handlers, for example but certainly not limited too 1" in thickness for residential HVAC systems. In similar commercial applications these thicknesses can be for instance, but certainly not limited to, between one and three inches. An exposure area, vent, opening, or slot 7 is provided within the housing, the exposure area 7 being of sufficient size to permit air from the air channel to be flowed there through. The unitary, sealed housing 10 contains an at least one motivator or movement device 20, in this instance a roller or shaft, the movement device 20 being driven by a motor 40 with a power source 50, a controller 60 and a filter media 70.

The unitary, sealed housing 10 can be in an exemplary embodiment, for example but certainly not limited to, environmentally friendly stiffened plastics, paper or cellulose product, organic plastic like compounds, or similarly green materials. The housing contains an at least one motivator or movement device 20, in this instance a take up shaft 21, having the filter media 70 attached thereto. In the embodiment shown, the take up shaft 21 is coupled to the motor 40 which is in turn coupled to the power source 50 and to the controller 60. The power source 50 is in this case being an environmentally friendly disposable battery, such as but certainly not limited to a lithium ion battery.

The controller 60 selectively powers the motor 40 based on inputs from an at least one sensor 80 in the exemplary embodiment. In further embodiments, see FIGS. 8 and 9 below for example, the sensors and controller can further communicate with additional elements of the air handler or a network or both. The controller 60 can, for example, comprise a printed circuit board having a microprocessor in communication with the at least one sensor 80. The at least one sensor 80 can for instance be a magnetic sensor that determines the position of the filter media 70 based on imbedded magnetic tags in the filter media 70. In the exemplary embodiment, the controller 60 is activated at installation and tracks days or hours in operation.

In the exemplary embodiment the controller 60 can count, for example but certainly not limited to, three months and activate the motivator or movement device 20, in this case the take up shaft 21 with motor 50. Based on the sensor input the controller 60 can determine the position of the media filter 70 and stop when a "clean" element or measured portion of filter media 70 is in position. The controller 60 can also be used to sense a condition of the air, the filter media 70, or a combination of both through communication with the at least one sensor 80. The controller 60 can also be used to advance the take up shaft 21 based on the sensed conditions or as a timed or pre-programmed operating profile or based on sensor data in further embodiments.

The advance of the shaft pays out or unfolds the uncontaminated filter media 72 on a first or feed side, designated by "A" in FIG. 1, of the housing 10. While simultaneously on the opposite side, a filter media take-up compartment 90 is located on a second or take up side, designated by "B" in FIG. 1 collecting the spent or contaminated filter media 77 in a designated containment area 90. In the embodiment of FIG. 1, spanning or support members 105 are laid in a grid and the unexposed filter media is drawn along it, as best see in FIG. 2. The filter media 70 has pleats already placed in it. The filter media 70 has an unexposed portion that is folded and compactly stored in the media storage area of the housing, the unexposed, folded portion of the filter media 72 when exposed to the airflow is oriented such that the pleats are matched against and pushed onto spanning or support members 105 through the pressure exerted by the passing air. This allows for a zig-zag pattern to form and increases the overall surface area of the filter media presented to the airflow in the channel.

In the instant embodiment the contaminated filter media 77 is folded on itself and thereby stores and captures the collected particulate matter. In additional embodiments, the contaminated filter media 77 is contained in a containment area 90 having a seal 100 to retain the contaminated filter media and any captured contaminants. In both cases, the contaminated filter media 77 is being collected within the containment area 90 and further within the unitary housing 10 so as to minimize exposure for reintroduction of the contaminants from the exposed or contaminated filter media 77 and, simultaneously, preventing contact of the containments with the operator or the environment during replacement. The HVAC filter media 70 is provided with a greater amount of filter material 70 stored in the filter media storage area 75 than existing rigid frame, stationary filters, allowing for extended life. For example, sufficient uncontaminated filter media 72 can be provided to make, for example, a multi-month, six or twelve month filter.

Once the uncontaminated filter 72 media is emptied, the controller can activate an indicator element 120. The indicator element can be, but is not limited to an audible alarm or visual indicator element or LED. Similarly, a scent material may be utilized on all but the last piece of the uncontaminated filter 72 media such that the absence or presence of the scent is an indicator that the filter needs to be replaced. Either after a specified time period or once the indicator element 120 is activated, the user simply removes and replaces the existing device in its entirety. The spent or contaminated filter media 77 is contained and the re-admission of the filtered contaminants is minimized. The expired HVAC filter 1 can then be safely disposed of with minimal environmental impact.

Figure 2:
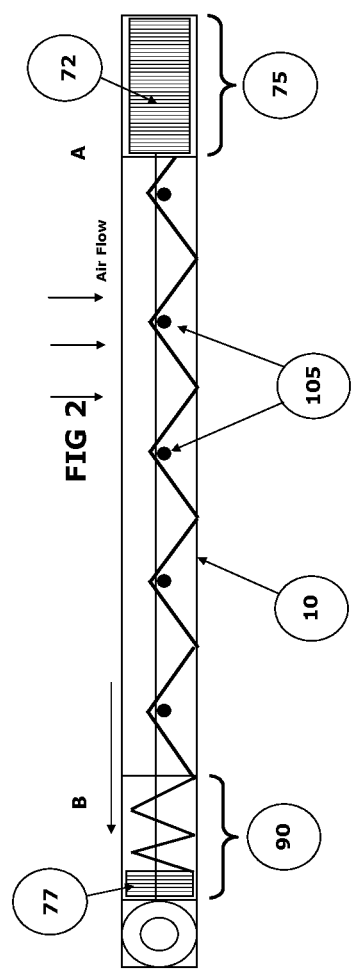
FIG. 2 shows a side view of the embodiment of FIG. 1.

FIG. 2 shows a side view of the embodiment of FIG. 1. As can be seen in the side view, the filter media 70 is pleated and compacted in a storage area 75. The movement member 20 is provided here via a cord, wire, or string 22 and take up shaft 21. The string 22 is attached to the pleated filter media 70 via reinforcement tabs 25. As noted above, as determined by the controller 60, the motor 40 and take up shaft or roller 21 are activated and roll the string 22. The string 22 is drawn for a predetermined time or length and accumulated on the roller 21. The expended or contaminated filter media 77 is then accumulated in a containment or storage area 90 as described above. The reinforcement tabs 25 can be made so that they release from the string 22 when it reaches the collection area 90.

Figure 3:
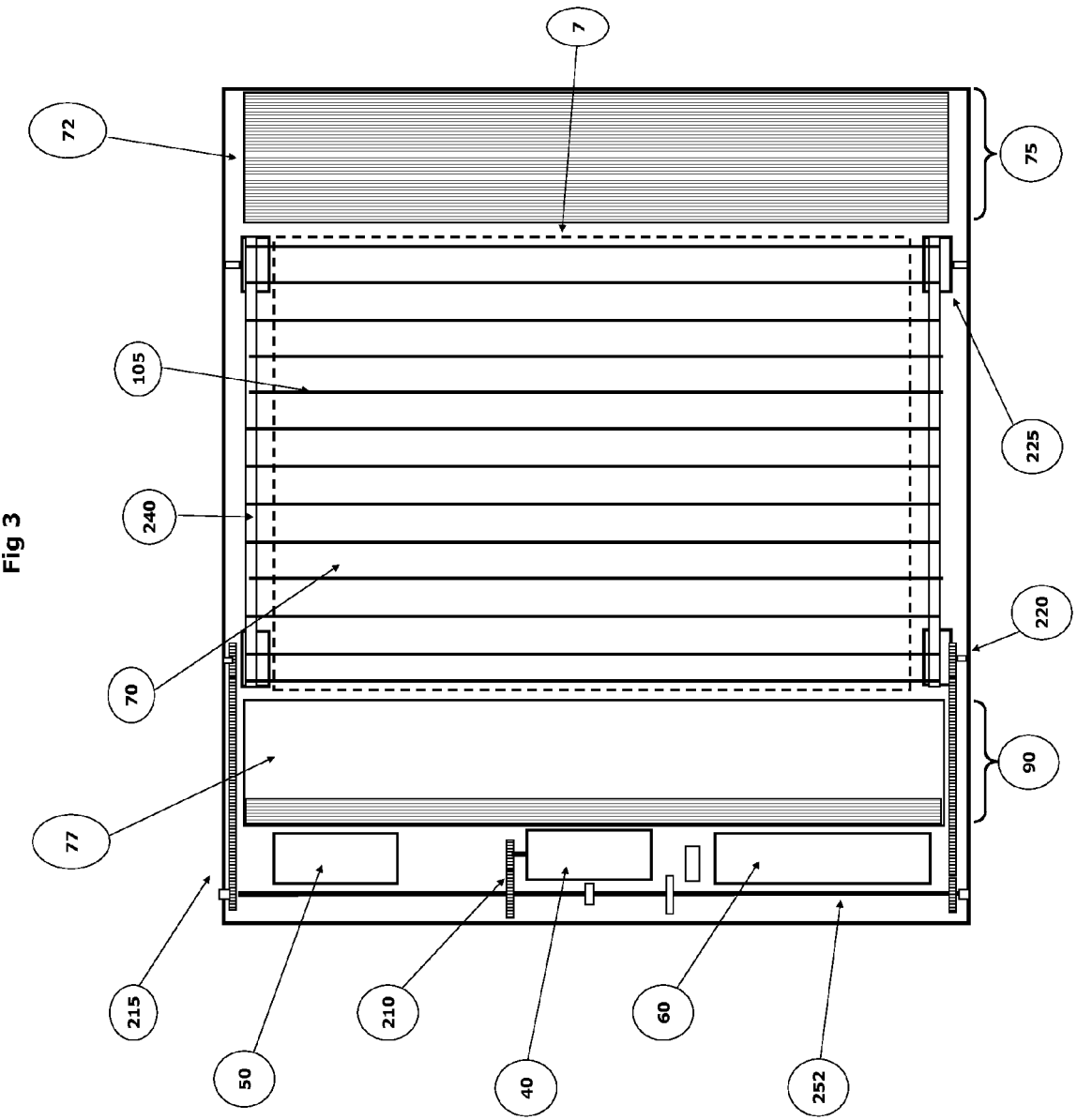
FIG. 3 shows a top view of a further embodiment of the instant invention.

FIG. 3 shows a top view of a further embodiment of the instant invention. The embodiment utilizes a similarly dimensioned direct replacement air filter having a sealed housing 10 that permits for direct replacement and use in existing HVAC units. The housing 10, controller 60, filter media 70 in its pleated and compacted state in a filter media storage area 75 are similar to the embodiment shown in FIG. 1. The motivator or movement device 20 in the exemplary embodiment of FIG. 3 can comprise a track member 230 and supporting members 240 the supporting members 240 spaced to fit within the pleats of the filter media 70. The track member 230 is moved by the motor 40. The motor 40 drives gear set 210 that drives a driveshaft 232. The driveshaft 232 in turn drives chain drive 215 which engages and turns a drive sprocket 220 that couples to the track 250. This in turn moves the filter media 70 from the stored, pleated area 75 unfolding an uncontaminated portion 70 therein, exposing the uncontaminated portion 72 to the air and contaminants in the air channel, and then moves the contaminated filter media portion 77 of the filter media to the spent or containment area 90 where it is stacked again and stored.

Figure 4:
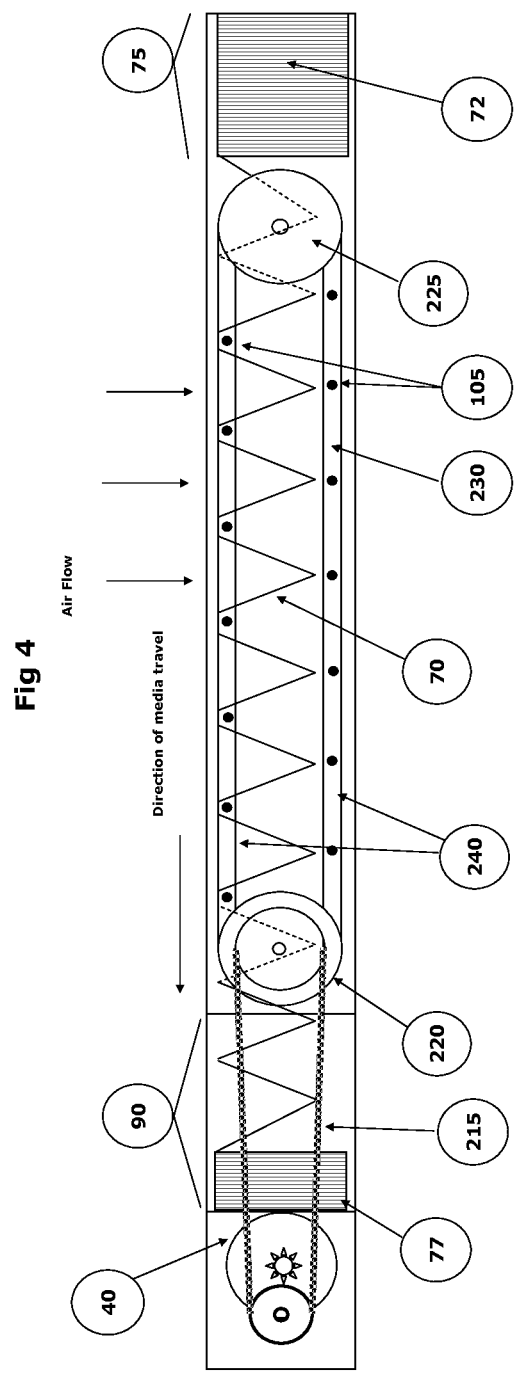
FIG. 4 shows a side view of the embodiment of FIG. 2.

FIG. 4 shows a side view of the embodiment of FIG. 3. The track member 230 with cross or support members 240 can be more clearly seen in this figure. The track member 230 is continuous and recycles the cross members 240. The pleats fold over the cross members 240 and are pulled by the cross members 240. The unexposed air filter media 72 is thus exposed to the air in the air channel and the air filtered. The cross members 230 allow the pleated, unexposed air filter media 72 to replace the spent or contaminated filter media 77 in the air channel. The air in the air channel also pushes the filter media into a zig-zag form along the pleats similar to the formation shown in the embodiment of FIG. 1. This zig-zag form increases the surface area of the filter media 70 exposed to the air in the air channel.

Figure 5:
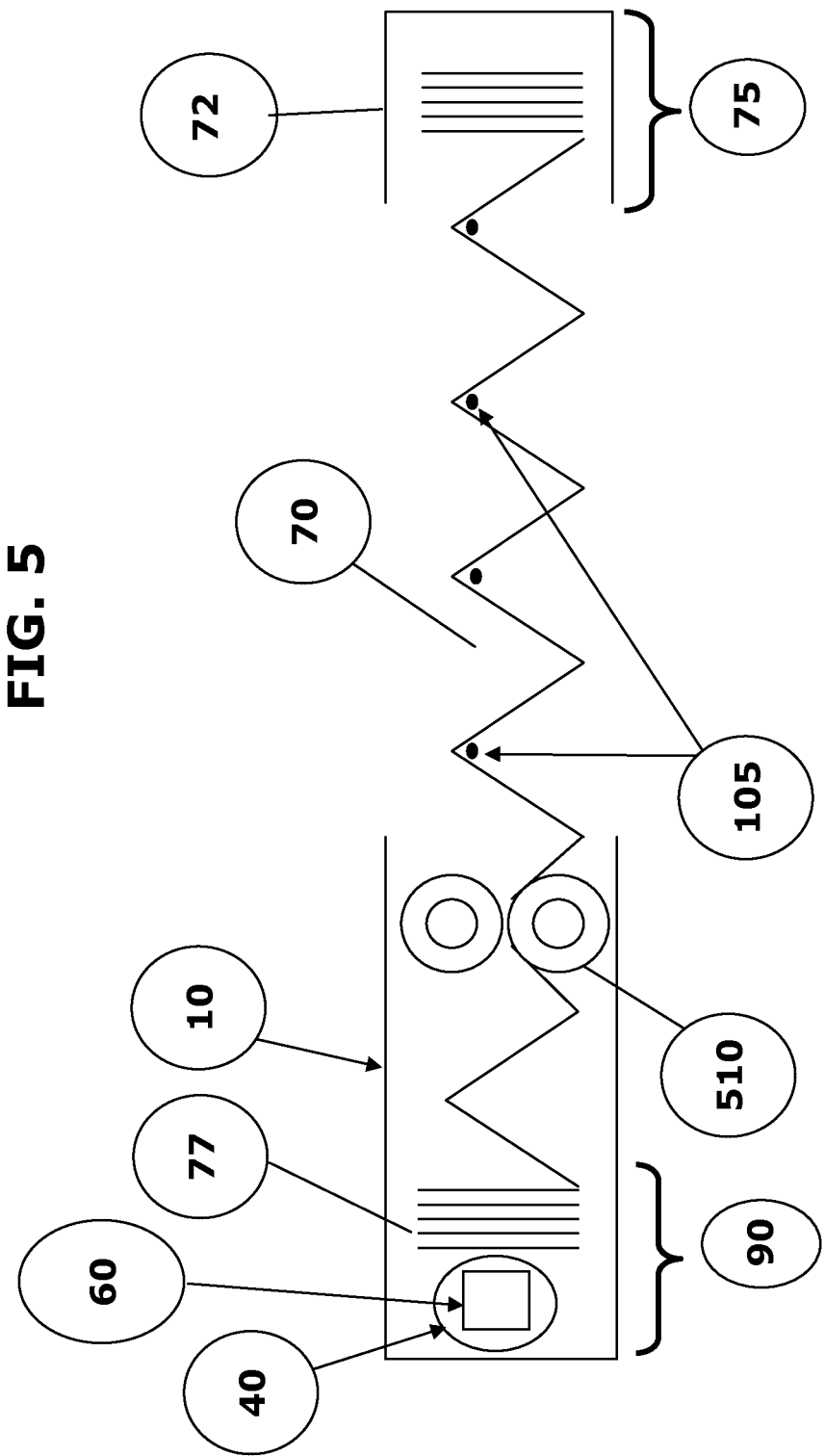
FIG. 5 shows a side view of a further embodiment of the invention.

FIG. 5 shows a side view of a further embodiment of the invention. In the embodiment shown, again the housing 10, motor 40, controller 60, filter media 70 in its pleated and compacted state in a filter media storage area 75 are all similar to the embodiment shown in FIGS. 1 and 2. The motivator or movement device 20 is simplified to an at least one set of puller or pinch rollers 510, that is the motivator or movement element pulls the filter media 70 from the pleated and compacted state in the filter media storage area 75 on the command of the controller 60 and moves it across the grid of lattice like members 105, as previously described above. In further embodiments the at least one set of puller or pinch rollers 510 can also be a star or toothed roller for added traction on the material or similar rollers that provide for efficient movement of the filter media within the device.

The lattice like members 105 allow the filter media 70 to more easily fold into its zig-zag pattern and act to support the media in place. As the filter media 70 is moved by the at least one set of "puller roller" set 510 from the stored, pleated area 75 unfolding an uncontaminated portion 72 therein, exposing the uncontaminated portion 72 to the air and contaminants in the air channel, and then moves the now contaminated filter media portion 77 of the filter media, on a command from the controller 60, to the spent or containment area 90 where it is stacked again and stored.

The embodiment as shown has an at least one set of puller rollers 510, here a single puller roller set. However, the embodiment could use multiple sets of rollers as needed. The single puller roller set is located at an end of the exposure slot 7 that is closest to the containment area 90. It is within the spirit of the invention to locate the puller roller set at or near the stored, pleated area 75. Similarly, additional roller sets can be employed to move the filter media 70 as noted, for example a second puller roller set near the stored, pleated area 75.

Figure 6:
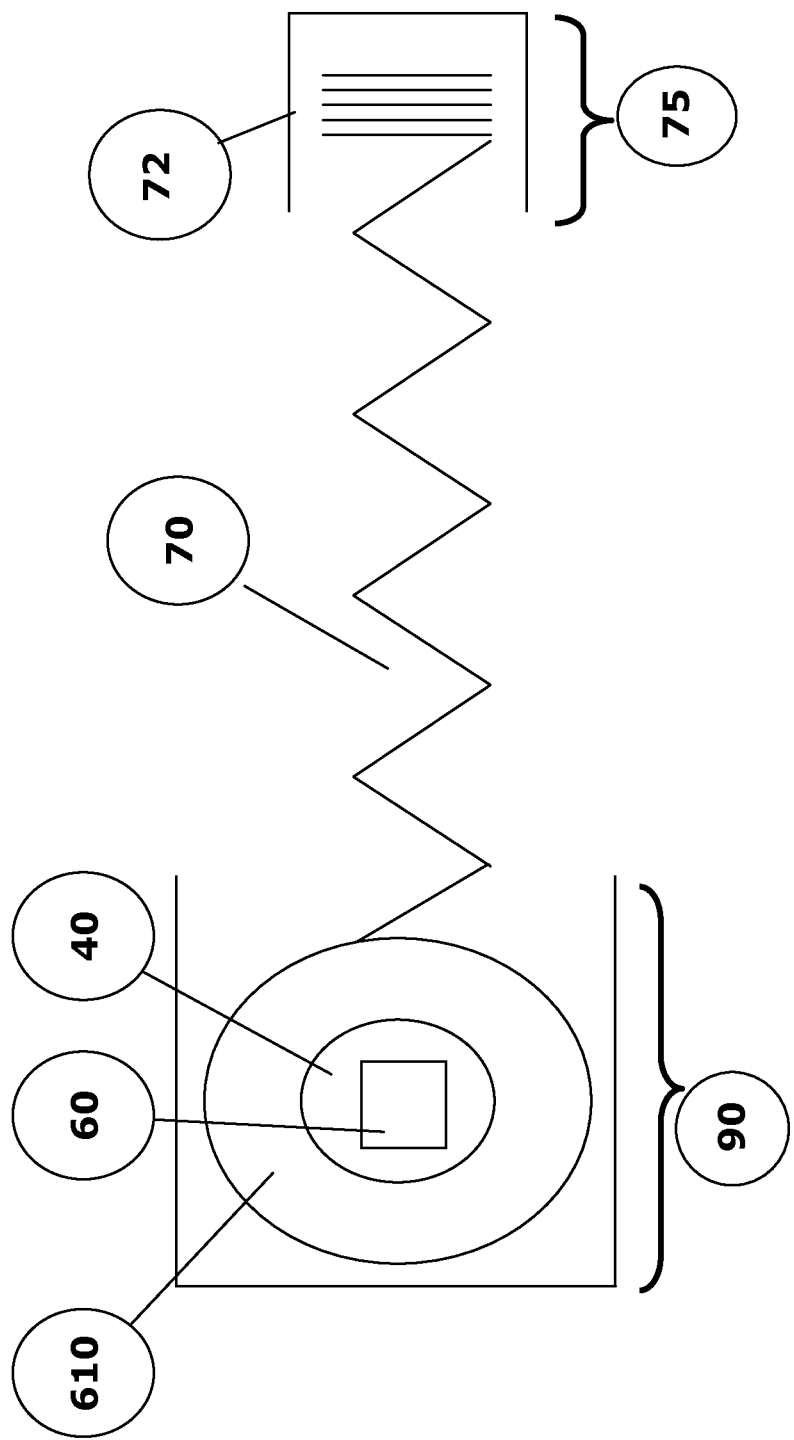
FIG. 6 shows another side view of a further embodiment of the invention.

FIG. 6 shows another side view of a further embodiment of the invention. Similar elements to those of FIGS. 1-3 are shown and not numbered for brevity. Again, similar to the previously described embodiments, the embodiment shown provides for a housing 10, controller 60, filter media 70 in its pleated and compacted state in a filter media storage area 75. A portion of unexposed filter media 72 is withdrawn from the media storage area 75, unfolded and drawn across a grid or lattice structure 105. The portion of unexposed filter media 72 is then drawn across the exposure slot 7 and exposed. In this embodiment, the motivator or movement device 20 is a take-up roller 610. The take up roller 610 rolls up the exposed filter media 77 in a flat roll format. The take up roller 610 is stored in the containment area 90 and can be sealed to prevent readmission of the filtered contaminates from the exposed filter media 77.

Figure 7:
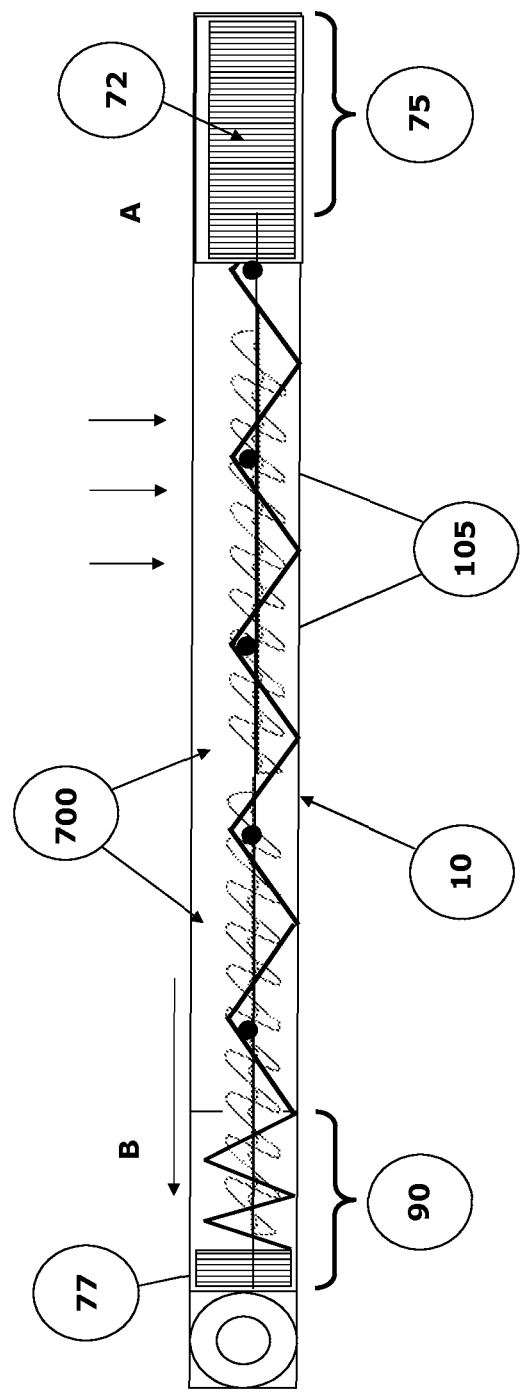
FIG. 7 shows another side view of a still further embodiment of the invention.

FIG. 7 shows another side view of a further embodiment of the invention. Similar to the previously described embodiments, the embodiment shown provides for a housing 10, controller 60, filter media 70 in its pleated and compacted state in a filter media storage area 75. A portion of unexposed filter media 72 is withdrawn from the media storage area 75, unfolded and drawn across a grid or lattice structure 105. The portion of unexposed filter media 72 is then drawn across the exposure slot 7 and exposed. In this embodiment, the motivator or movement device 20 is an at least one screw drive 700. The screw drive 700 allows for a strong connection to the filter media 70 and for continuous movement along the path from the filter media storage area 75 to the collection area 77.

FIG. 8 shows a still further embodiment of the invention. Similar elements to those of FIGS. 1-3 are shown and not numbered for brevity. The further embodiment show utilizes a further variation of a movement device 20 by utilizing a first roller 780 mounting an unexposed roll 72 of filter material 70 and a second roller 770 rolling up the exposed filter material, in this instance pleated filter material, into a storage area 77. The material being rolled from the first of the at least two rollers then 770, after exposure, being wound up on the second of the at least two rollers 780. Within the filter frame 10, supporting members 105 span the exposure slot, with the supporting members 105 spaced to fit within the pleats of the filter media 70. The pleated filter material 70 being moved such that the pleats fold over the cross members 105 and are pulled across the cross members 105 by the movement of the air in the air channel. The unexposed air filter media 72 on the unexposed roll 780 is thus exposed to the air in the air channel and the air filtered as it is moved from roll to roll. The cross members 105 allow the pleated, unexposed air filter media 72 to replace the spent or contaminated filter media 77 in the air channel. The air in the air channel also pushes the filter media into a pleated, zig-zag form along the pleats similar to the formation shown in the embodiment of FIG. 1. This zig-zag form increases the surface area of the filter media 70 exposed to the air in the air channel. This represents yet another means of moving the air filter media within the filter housing. It should also be noted that the uniform thickness and the sealed nature of the frame may be varied in this and other embodiments. Especially in industrial and commercial embodiments of the invention.

FIG. 9 shows a plan view of an exemplary embodiment of the invention. The inclusion of electronics and a controller 60 on, for example, a printed circuit board on the filter 1 provides an opportunity for added functionality in addition to extended operating length. As noted above with respect to FIG. 1, the controller 60 can also be used to sense a condition of the air, the filter media 70, or a combination of both through communication with the at least one sensor 80. The exemplary version shown in FIG. 9 can utilize any of the filter advance systems previously discussed to provide Air Quality Management (AQM) features. AQM is a system designed to be incorporated into the filter 1 to monitor the quality of the air as it passes through the filter 1 and interact with a network system to monitor the air quality at the point of filtration.

The AQM system is comprised of an at least one air quality sensor 80, with added processor modules 62 and data transceiving modules 63 on the controller 60. The at least one sensor is incorporated into the filter frame such that it is in the path of air as it is drawn though the filter frame 10 at the exposure slot 7. The processor module 62 and transceiver module 63 are housed within the filter frame 10 near the drive motor and are powered from the same power supply as the motor. The controller 60, processor modules 62, and transmitting modules 63 have software on them to measure and report air quality parameters from the at least one sensor 80. They may report the air quality parameters to an internal storage device (not shown), wirelessly 1010, or via wired communication 1020 directly to a network 1000. Alternatively, in other embodiments an external device which may store the data and/or be enabled to communicate with the network 1000 via wire 1020 or wirelessly 1010 and thereby may report the parameters to the network 1000 as shown in FIG. 9 and described herein below. These can be powered by an onboard, independent power supply or, for example, be powered by a dedicated external power supply in for instance an industrial or commercial application like a paint spray booth.

The at least one sensor 80 allows the system to monitor the air and in conjunction with the processor, collects data regarding air contaminants along with air quality. These sensors may include but are not limited to sensors that detect and report temperature, mold, carbon monoxide, carbon dioxide, Volatile Organic Compounds, smoke, fire, Noxious Gases, Air Particle Concentration and other potentially dangerous compounds. The at least one sensor 80 can also detect pressure drops and communicate that info back to the filter 1 so that the filter 1 can set the changing cycle accordingly and advance the filter media 70 accordingly. For example, if the filter 1 is pre-set to change the filter media 70 every ninety days and last twelve months but the media is being contaminated at a higher rate as detected by the at least one sensor 80, it will move up the next change to facilitate a consistently clean filter. This change can also be reported out from the filter 1 through the controller 60 and the transmitting modules 63. This real time monitoring can be incorporated in residential unit applications or in industrial and commercial unit applications.

In addition to monitoring air quality, performance measures can also be communicated as part of the data retrieved from the at least one sensor. A non-limiting example, as noted in the previously described embodiments of FIGS. 1-8, an air flow meter can be included in the at least one sensor 80. This would allow, in conjunction with the processing modules 62 on the controller, a measurement of estimated energy usage. This can be reported through the network 1000 by the transceiver module 63 and reported to an alert device, including for example but not limited to a cell phone, a computer, a network operations center or the like. Additionally, as part of the programming on the processing modules 62, the controller 60 can download program guides through the network and notify users and allow for additional configuration options of the air handler.

All of this information can be stored or sent in real-time or both. The information can be sent, for example but certainly not limited to, to a reporting station, internet access portal, network interface device or internet cloud server via wireless signal, cellular or WI-FI/Internet Wireless Protocol technology or similar signal convention, that is accessible to the user via computer or smart phone or similar device, as shown in FIG. 9. The air quality parameters and data on the operation of the filter can also be retrieved directly from the filter via a communications port 67 located on the filter frame, for example but certainly not limited to a USB port or a mini-USB port or similar communications port. Reports can be generated that can be retrieved showing the status of the air filter and the air quality over time. This can also be available for review by a report device accessed by the homeowner and/or building management or to a Network Operations Center (NOC) of the type typically found in industrial or commercial applications or provided as a function of an alarm or alert service in a residential setting or commercial setting.

The network 1000 can then transmit the information to a wireless device or wired device as a network interface 1030, for example, but certainly not limited to a smart phone or hand held computer or netbook or similar device 1060. The network 1000 can also report the data to a computer or other device 1040, wired 1010 or wirelessly 1020 coupled to the network 1000, to report air quality or other aspects of the filter 1. Finally, the data can be communicated to a Network Operations Center (NOC) or master control center 1050, all of these options happening alone or in conjunction with one another, the NOC which is actively monitoring the filter 1 and the air quality in the air handler. A non-limiting example of the operation of the Network Operations Center 1050 can be a third party alarm monitoring company which is monitoring air quality for a customer or several customers. Another non-limiting example can also make the NOC part of a manufacturing facilities control center as part of a commercial or industrial process whereby the air handler unit is being monitored by the control center, for instance in chemical production or commercial painting booths.

Notification or alerts, including those previously described in relation to FIGS. 1-8, may be sent to the homeowner or building management or NOC of urgent conditions. These can include emergency alerts that may require immediate attention. This may be a part of the design of a monitoring system enabled via the network or as a paid third party monitoring service. This service may be offered for a monthly fee or reported to a security monitoring company, for example, either via internet, email, cellular, text message or telephone or any other fashion that fits the service providers reporting network. Other responses can involve communication from the filter or from other elements in the network which may, in case of sensing certain parameters i.e. dense smoke, take action with other network components. A non-limiting example of such an action is having the air handler controller turn off the air circulation system via communication with the thermostat or similar device to prevent smoke circulation when a smoke or fire or other dangerous substances are detected in the air.

Thus, in addition to providing a unique air filter with the ability to provide and extended useful life with the movement of the filter media, the instant invention includes a method for alerts for replacement and possibly delivery of replacement filters. Additionally, a method of monitoring services is also conceived hereby for use in conjunction with or apart from the method of alerting and replacement.

An inventive method of seamless replacement delivery can be accomplished by employing the filter of FIGS. 1-8 with or without the AQM system. By including just the transceiver modules 63, with or without the additional processor modules 62, an enhanced convenience for air handler owners can be incorporated into the sale of the filter. The filter 1, which as noted above can send a signal when the uncontaminated media 72 has been completely dispensed, with the transmission module 63 can send an alert to a user through one of the alert devices 1040, 1050, or 1060 and a replacement air filter can be sent. This can of course be conditioned on confirmation from the owner of the air handler or can be provided as part of a monthly service. Additionally, the alert can be sent to a center and service personnel dispatched as part of a standard maintenance response or as part of a paid for maintenance service.

In yet another application, as noted above by incorporating the at least one sensor 80 and the processor modules 63, in addition to sending a signal at the completion of the distribution of the uncontaminated filter media 72, real time monitoring can be completed and sent as part of a monthly service contract or as part of a regular maintenance screening or as part of an emergency response. The at least one sensor 80 can transmit data through the controller 60 and the processor modules 62 and transceiver modules 63, the data can be routed to a third party service provider that maintains the air handler and monitors air quality for a subscriber. The data can also be transmitted as part of a regular maintenance monitoring or screening system in an industrial or commercial application to a NOC or similar central control 1050. Also, as noted, the data may also be transmitted as part of an emergency response to a third party or emergency responder or both and additional signals could be transmitted through a network to shut an air flow off and prevent promulgation of hazardous airborne contaminants.

Figure 10A:
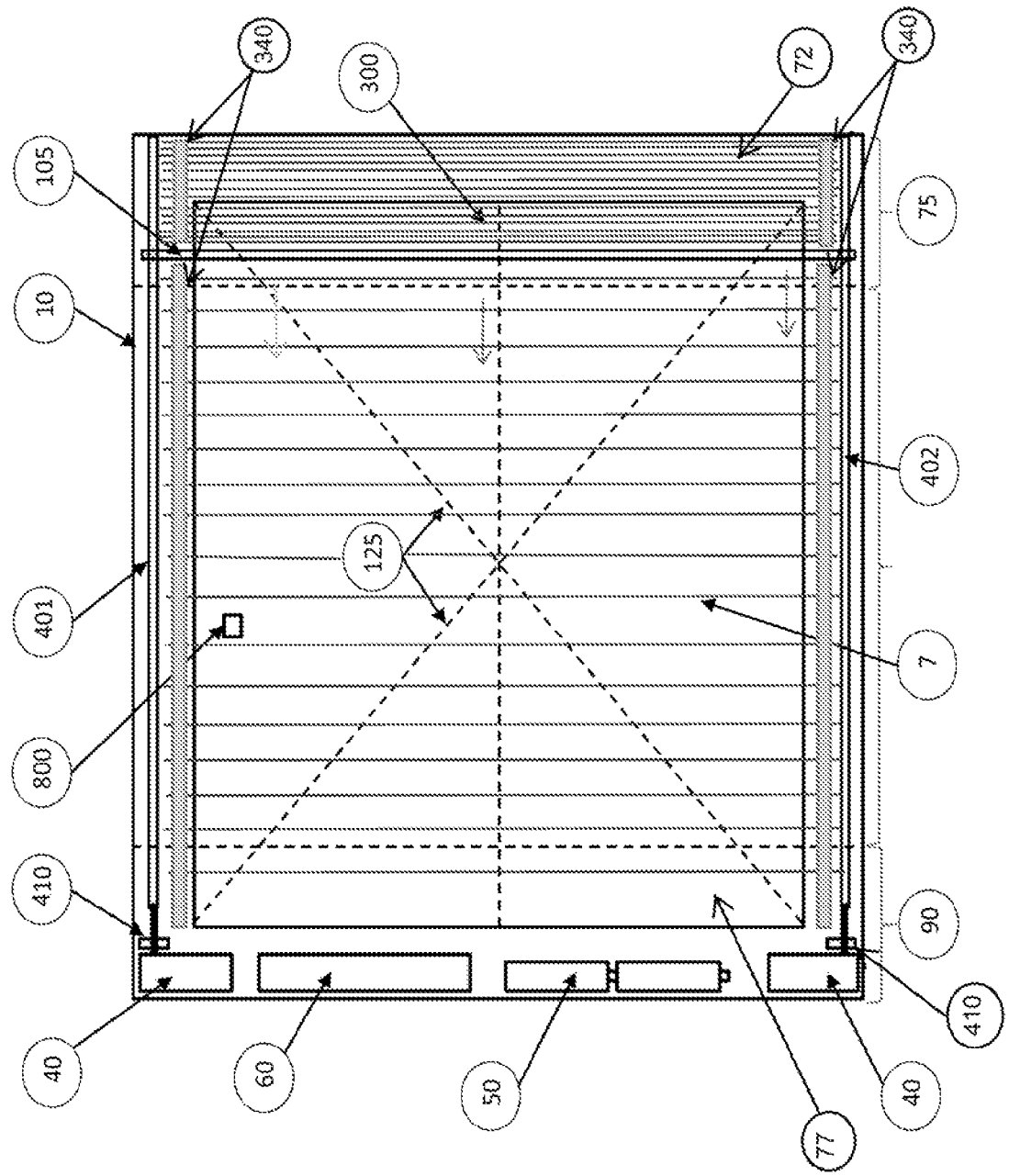
FIGS. 10A and 10B show a top view and side cutaway view respectively of a further exemplary embodiment of the instant invention.
Figure 10B:
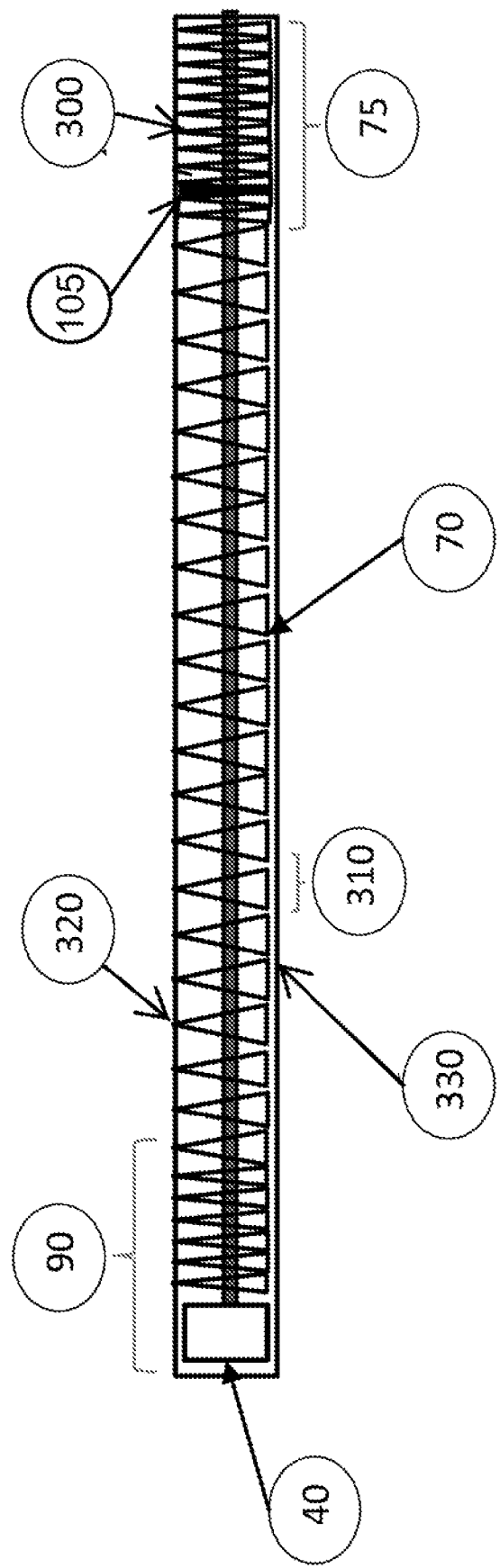

FIGS. 10A and 10B show a top view and side cutaway view respectively of a further exemplary embodiment of the instant invention. The embodiment has the aforementioned housing 10 similar to those previously disclosed. A power source 50 is provided, here the non-limiting example being shown as two batteries. The power source 50 provides power to the at least one motor 40, in this exemplary embodiment a non-limiting example having two motors, and a controller 60. The exemplary embodiment utilizes a folded pleated filter media 70 stored in one side of the housing or frame structure 10 forming a pleated filter media stack 300 of uncontaminated filter media 72 in the filter media storage area 75.

The folded pleated filter media stack 300 is stored and the pleats are adhered in at least a portion of the space between the tops or peaks 320 and troughs or valleys 330 of each pleat 310 sealing its sides. Additionally a specific spacing of the pleats or "pleats per inch" is provided in the pleated filter media 70. In this instance, the spacing is kept by an at least one pleat support member 340, for instance a running length of tape or similar adhesive element as shown running with the same axis as that of the movement of the device. Applicant's co-pending application for a "Method of Adhering A Pleated Filtration Media and Filter and Media Stack Using Same", filed on Feb. 28, 2012 provide for some examples of structures and methods of adhering a filter media stack and the application is hereby incorporated by reference as providing non-limiting examples of such adherence. Additional methods may be used to provide the folded, pleated filter media stack 300 and the at least one pleat support member 340, so long as the folded, pleated filter media stack 300 is provided in the compact form and can be selectively removed by the at least one movement member 20 in the direction shown with the motion arrow in the figures.

The at least one movement member 20 in this instance is a type of screw drive, a threaded rod screw drive. In this exemplary embodiment the at least one movement member 20 is shown as two threaded rod screw drives 401, 402. The pair of threaded rod screw drives 401, 402 are each supported on one end by a movement member support 410. The at least one motor 40, in this case a motor for each threaded rod screw drive 401, 402, engages the threaded rod screw drive 401 and turns the threaded rod screw drive 401 within the movement member support 410. The movement member support 410 may also contain a turns counter that communicates with the controller 60. The turns counter is used to determine the linear distance the threaded rod screw drive 401, 402 is effectively driven. On the other end the threaded rod screw drives 401, 402 are supported by the housing or frame 10 and are free to turn. A support member 105 is shown just outside of the at least one exposure slot 7 inside the pleated filter media storage area 75. Although a single support member 105 is shown, several can be included and engaged and/or staged to allow for further or more than one change of the pleated filter media in the exposure slot. In the embodiment shown, there are also caps shown in shadow (dotted lines) that cover the housing 10 and define the exposure slot 7. In addition to the caps, an at least one housing support member 125, hear a crossed set of members, is shown in shadow.

Each of the threaded rod screw drives 401, 402 is engaged by the respective motor 40 when initiated by the controller 60. The controller 60 signals the motor 40 based on any of the aforementioned manners, including but not limited to a timer or a sensor 800 output. The controller 60 is provided to selectively determine when to advance the threaded rod screw drives 401, 402 by engaging the motors 40. The controller 60, as noted above, can be a simple timer. However, in a non-limiting example, as shown in this exemplary embodiment an optical sensor 800 is used to send signal the need for advancement of the pleated filter media. In this exemplary embodiment the optical sensor 800 is provided and communicates with the controller 60. The optical sensor 800 sends a signal when a threshold measurement is reached. Software on the controller determines when these measurements are made and the threshold levels of obstruction or color change on the exposed filter media 77. In addition to the frame 10 and the threaded rod screw drives 401, 402, as noted housing support members 125 are provided at an angle from one side to the other on the housing 10 to provide additional structural support.

The threaded rod screw drives 401, 402 engage the support member 105 when the controller 60 signals the motor 40 and begins a change of the filter media 70 that has been exposed in the at least one exposure slot 7 to create an exposed filter media 77 portion. The at least one support member 105 is pulled toward the motors 40 in this exemplary embodiment as shown by the arrows denoting movement. The support member 105 in a non-limiting example used in the exemplary embodiment is a plate threaded onto each of the threaded rod screw drives 401, 402. The support member 105 can also be pushed from the side with the motors 40 without departing from the spirit of the invention. The folded, pleated filter media is unstacked and moved into the exposure slot 7 by the threaded rod screw drives 401, 402 while maintaining the pleat spacing or PPI. The threaded rod screw drives 401, 402 then move the exposed pleated filter media 77 through the exposure slot 7 and into a containment or storage area 90 at an end of the housing or frame 10 while simultaneously moving the unexposed pleated filter media 72 from the filter media stack 400, selectively removing the pleats from their adhered and stored state to a deployed or extended or unstacked state for filtration of the flow within the flow channel. Thus the folded, pleated filter media stack 300 is moved from its compacted position to an extended or operating position to replace the exposed filter media 77, affecting a partial or a complete change of the filter material in the exposure slot 7.

Figure 11A:
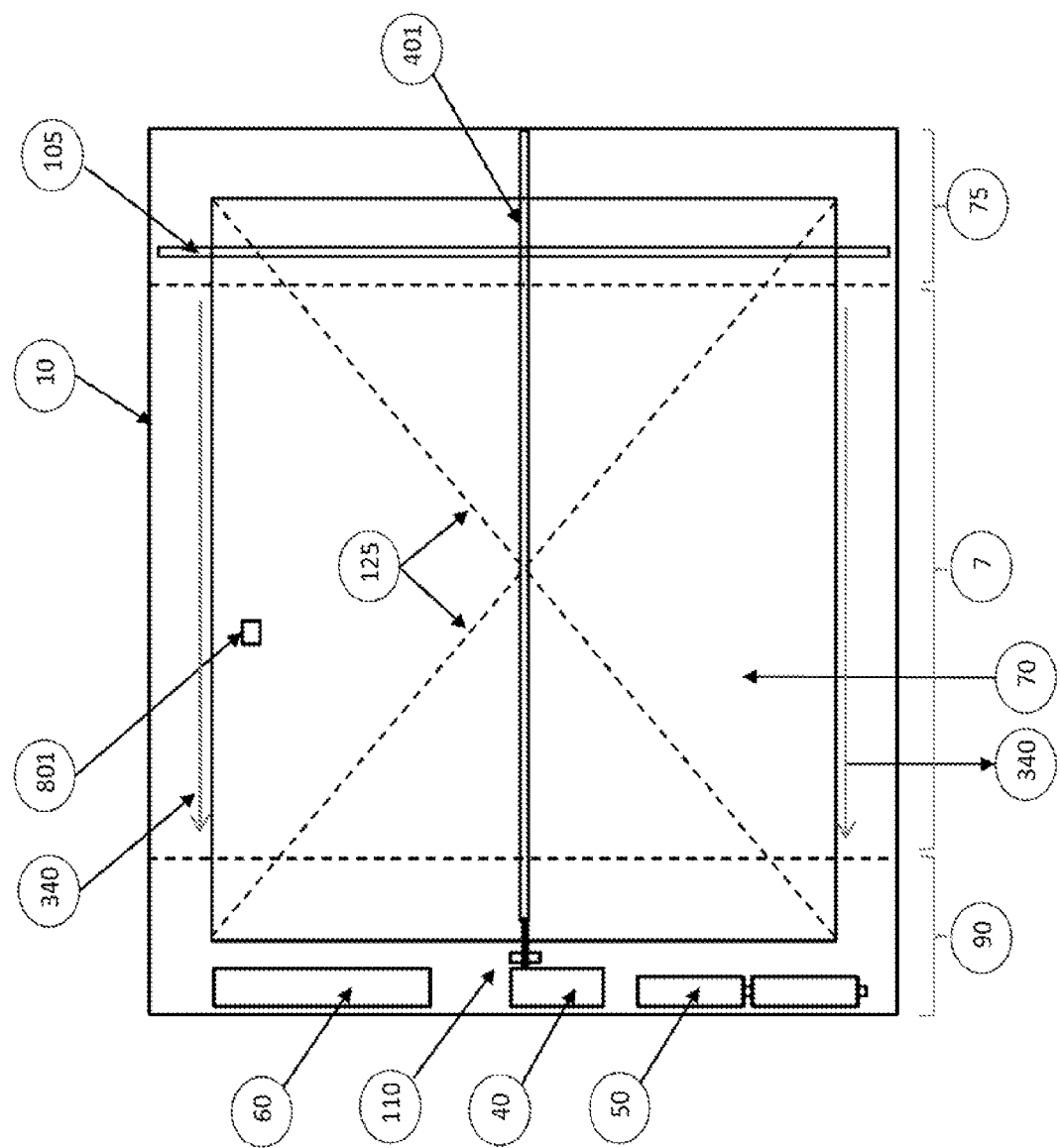
FIGS. 11A and 11B show top down view and side cutaway view respectively of a still further exemplary embodiment of the instant invention.
Figure 11B:
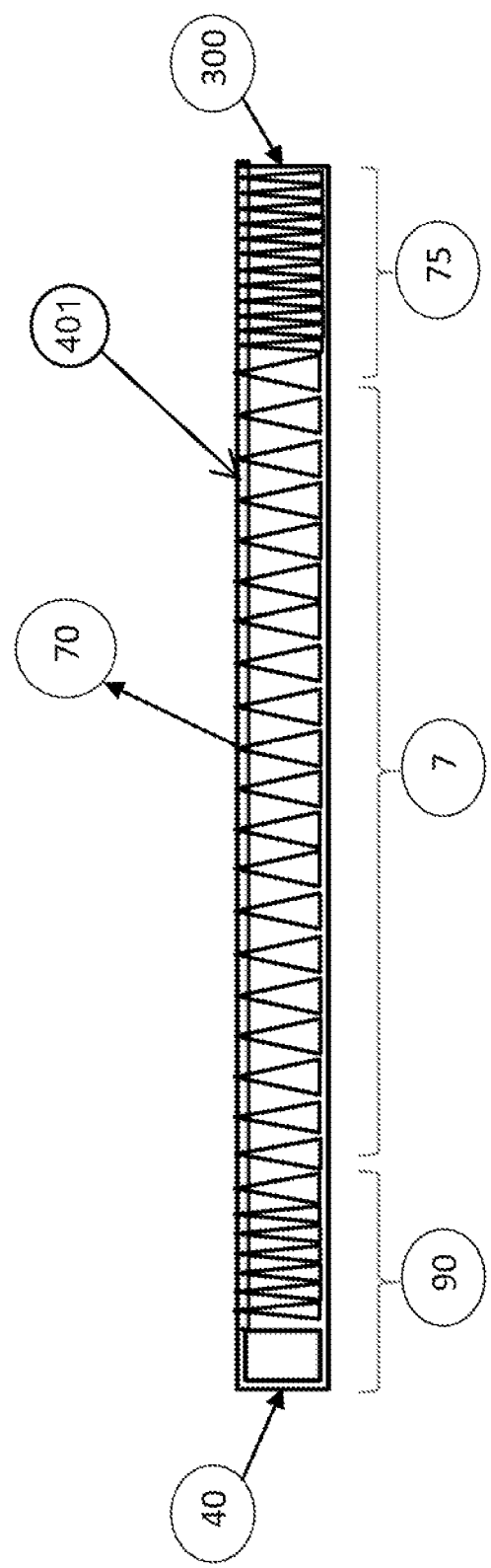

FIGS. 11A and 11B show top down view and side cutaway view of a further embodiment. The housing 10, motor 40, power source 50, unexposed filter media section 75 and containment area 90 are substantially the same as that shown in FIGS. 10A and 10B. The movement member 20 is again a threaded rod screw drive 401, however, in this embodiment a single threaded rod screw drive 401 and a single motor 40. In this instance, the threaded rod screw drive 401 is threaded such that the drive is spaced at and engages and passes over the top or peak 320 of each of the pleats 310 at a specified spacing or pleat per inch (PPI) as it moves the folded pleated filter media 70 from the folded pleated filter media stack 80 by selectively engaging and unstacking the folded pleated filter media stack 80. This can be done in conjunction with the adhesion process noted above in relation to FIGS. 10A and 10B to assist in maintaining the specified spacing or pleats per inch (PPI). Moving such a movement member 20 may be aligned so that it moves over the tops or peaks 320 or troughs or valleys 330 or both the tops and troughs of each pleat 310 to assist in the movement of the filter media 70 and maintenance of the spacing or PPI.

The embodiments and examples discussed herein are non-limiting examples. The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A direct replacement filter within a flow channel comprising:
    a housing with an at least one exposure slot;
    an at least one filter media storage area within the housing, having unexposed folded, pleated filter media stored therein, the unexposed folded, pleated filter media being pleated, folded, and stacked to be compactly held within the at least one filter media storage area;
    an at least one motor coupled to a power supply and in communication with a controller, the at least one motor moving an at least one threaded rod screw drive coupled to an at least one support member; and
    a containment area, wherein upon sending a signal from the controller the at least one motor is engaged and the at least one threaded rod screw drive is driven such that the at least one threaded rod screw drive is moved in turn moving the at least one support member which engages the unexposed folded pleated filter material in the at least one filter media storage area, moving the unexposed folded pleated filter media from being stored into being unfolded and exposed in the at least exposure slot and moving an exposed portion of the filter media through the at least one exposure slot toward the containment area such that the at least one exposed portion of the filter media is moved to and then collected and retained within the containment area.

2. The direct replacement filter of claim 1, wherein the pleated filter media further comprises individual pleats with an at least one portion of each pleat adhered in a selectively releasable manner to the immediately preceding pleat such that the at least one threaded rod screw drive selectively releases the pleats by movement of the at least one support member.

3. The direct replacement filter of claim 2, further comprising a pleat spacing member, wherein the at least one pleat spacing member folds with the compression of the folded, pleated filter media when stored and maintains a desired pleat spacing in an uncompressed or unfolded state when moved into the at least one exposure slot.

4. The direct replacement filter of claim 1, further comprising an at least one pleat support member, wherein the pleats are supported by the pleat support member.

5. The direct replacement filter of claim 3, wherein the pleat support member is at least on strip of double sided adhesive tape.

6. The direct replacement filter of claim 2, wherein the at least one threaded rod screw drive is moved along the top or bottom or top and bottom of the pleated filter media engaging the tops, troughs or tops and troughs of the pleats of the folded pleated filter media at a specified pleat spacing or pleats per inch related to the pitch of the at least one threaded rod screw drive aiding in the movement of the filter media into and from the at least one exposure slot.

7. The direct replacement filter of claim 1, wherein the containment area has a sealing member to seal the containment area.

8. The direct replacement filter of claim 1, wherein the at least one threaded rod screw drive movement re-folds the at least one pleated filter media after its exposure and stores it compactly in the containment area.

9. The direct replacement filter of claim 1, further comprising an at least one sensor, wherein the sensor sends a signal to the controller to activate the at least one motor and move the at least one threaded rod screw drive.

10. The direct replacement filter of claim 9, wherein the controller communicates data from the at least one sensor to an alert device.

11. The direct replacement filter of claim 1, wherein the controller further comprises a clock or a programmed advancement profile, wherein the at least one threaded rod screw drive is engaged based on the clock or the programmed advancement profile.

12. The direct replacement filter of claim 1, wherein the power supply is a battery or battery pack.

13. The direct replacement filter of claim 1, wherein the power supply is a conventional electrical power supply.

14. The direct replacement filter of claim 1, wherein the housing/frame is unitary being sealed throughout to prevent opening of the unitary housing.

15. The direct replacement filter of claim 1, further comprising an at least one processing module and an at least one transceiver module on the controller and an at least one sensor, the controller communicating with the at least one sensor, the at least one sensor communicating data to the processing module and the controller, and the transceiver module transmitting data from the filter to a network or a storage device.

16. The direct replacement filter of claim 15, wherein the at least one sensor measures temperature, mold count, carbon monoxide, carbon dioxide, Volatile Organic Compounds (VOCs), smoke, fire, noxious gases, and air particle concentrations.

17. The direct replacement filter of claim 15, wherein the at least one sensor measures air flow and reports estimated energy consumption to the network or storage device.

* * * * *